March 2, 1943.   J. F. O'BRIEN   2,312,579
METHOD OF APPLYING COUPLING DEVICES
Filed Sept. 15, 1939
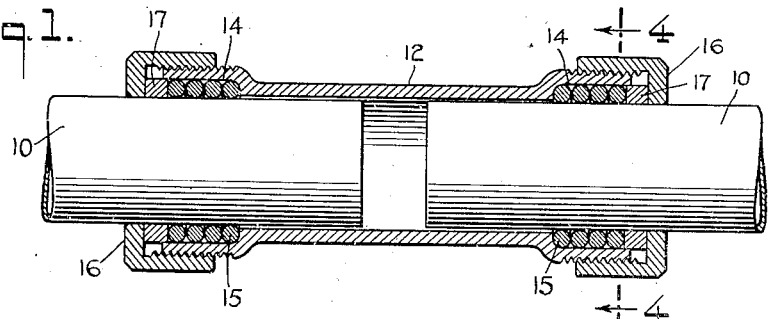
Fig. 1.
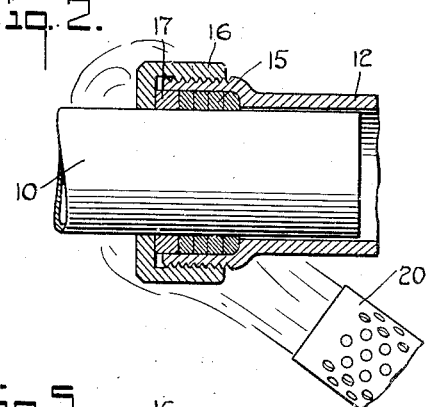
Fig. 2.
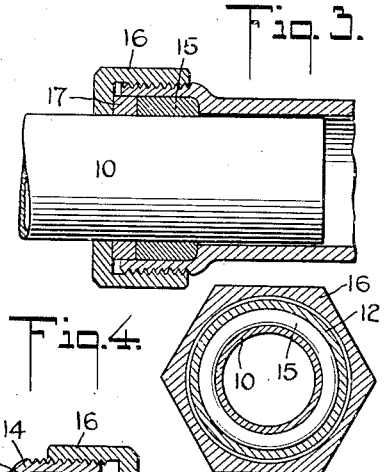
Fig. 3.
Fig. 4.
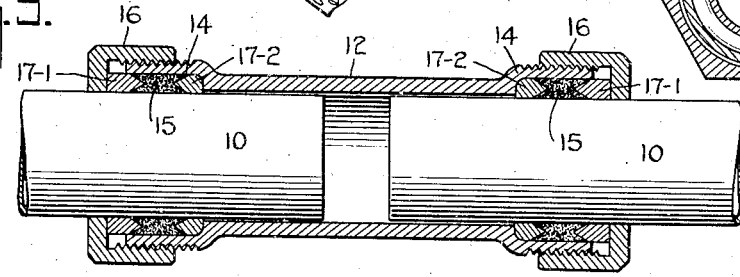
Fig. 5.
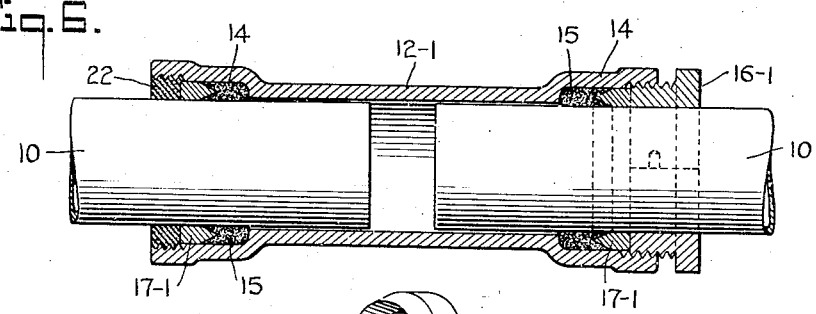
Fig. 6.
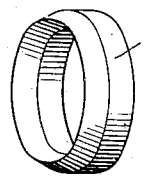
Fig. 7.
INVENTOR
Joseph F. O'Brien
BY
Henry J. Lucke
HIS ATTORNEY Patented Mar. 2, 1943

2,312,579

UNITED STATES PATENT OFFICE 2,312,579

METHOD OF APPLYING COUPLING DEVICES

Joseph F. O'Brien, Jersey City, N. J., assignor to John B. Pierce Foundation, New York, N. Y., a corporation of New York Application September 15, 1939, Serial No. 294,986

1 Claim. (Cl. 18—59)

This invention relates to improvements in coupling devices, and to methods of coupling abutting ends of conduits or the like.

In particular, the invention relates to improved sleeve coupling means and the method of securing said coupling to conduits or like devices to be coupled.

It is an object of the invention to provide an improved coupling means wherein packing material of preferably fusible nature may be operated upon in a manner which will insure an integral ring of packing substantially free from voids, and in adhesive relationship to the coupling and to the devices coupled thereby.

Another object of the invention is to provide an improved coupling containing a pocket in which may be placed packing material, and embodying means for compressing said packing material to completely fill the space between the conduits and the coupling, thereby to eliminate voids therebetween.

A further object of the invention is to provide an improved means whereby a conduit or like device may be telescoped within a belled end of a sleeve, and wherein packing or caulking material may be disposed within said sleeve about said conduit, compacted therein to substantially completely fill initially existing spaces between the conduit and the coupling, and treated to insure an adhesive bond therebetween.

In the present invention, the coupling means may include an open ended sleeve, provided at such open ends with a recess within which may be placed a suitable packing material. At such open ends, the sleeve is provided with screw threading of suitable extent. Upon inserting a conduit or like device to be coupled into the sleeve from an end thereof, a suitable packing material, preferably of such nature that it will adhere to the sleeve and to the external wall of the conduit, is placed within the stated pocket. Such packing material may be in the form of wire solder, rope of suitable fusible material, or may be in the form of a suitable plurality of annular rings of such internal and external diameter as will permit a ready slidable fit within the coupling pocket and around the ends of the conduits. Upon the positioning of the packing material, the material may be tightly compressed within the pocket through the agency of an annular bearing member and a nut, the latter engaging with the threading of the coupling.

Assuming that wire solder or a rope-like packing has been employed, it will be obvious that voids will initially exist between adjacent strands or rings of the rope-like material, and between the conduit and the inner wall of the coupling member. Were such voids permitted to remain, and in the further circumstance that the assembled coupling and conduit were in a horizontal or equivalent position, it is obvious that upon fusing the packing material, a portion of it may flow, by gravity, to occupy the voids at the under side of the coupling, thereby robbing the upper portion of the coupled conduit of an adequate body of packing material.

In the present invention, however, the compression of the packing material prior to the fusing thereof will substantially eliminate all voids therein, whereupon the packing material, when fused and permitted to solidify, attains an integral mass of packing of substantially uniform thickness, and in substantially uniform engagement with the conduit and the interior wall of the coupling.

In the circumstance of using solder or the like for the packing material, the walls of the conduit and the coupling member may be treated in such manner as to form an actual metallic bond of the packing material with said walls. However, a non-metallic packing material may be employed, said material being preferably of the nature of a thermo plastic, whereupon the engagement of the fused and solidified thermo plastic material with the outer wall of the conduit and the inner wall of the coupling will be of the nature of an adhesive contact. In either circumstance, the joint between the conduit and the coupling will be substantially water proof and substantially leak proof.

A feature of an embodiment of the invention lies in a novel organization of screw-threaded means for effecting the compacting of the packing material as aforesaid, said screw threaded means being removable, upon completion of the packing operation, for reuse.

Other features and advantages will hereinafter appear.

In the accompanying drawing:

Fig. 1 is a representation, partly in section, of a coupling member with the conduits inserted therein, and fusible packing material of annular or continuous rope-like character positioned within the coupling member;

Fig. 2 is a representation of an end of the coupling, subsequent to the compacting of the packing material and during the stage of fusing said packing material;

Fig. 3 shows the coupling member at the termination of the fusing step;

Fig. 4 is an end elevation taken through the lines 4—4 of Fig. 1;

Fig. 5 is a representation of a second embodiment of the invention, illustrating a second form of sealing-material compacting means;

Fig. 6 is a sectional elevation of a third embodiment of the invention, illustrating the employment of a split nut for compacting the packing within the coupling; and Fig. 7 is a perspective of an annular ring employed in the embodiments of Figs. 5 and 6 to effect the compacting of the packing.

Referring to the drawing, conduits 10, 10, may be coupled by means of an external sleeve coupling 12. The internal diameter of the coupling 12 is desirably of such size as will permit it to be readily slidable over the ends of the conduits 10, 10, with suitable small clearance therebetween.

In the embodiments of Figs. 1 through 5, the ends of the coupling 12 are belled and exteriorly threaded. The belled portions provide pockets 14, 14, the interior walls of which may be suitably machined to afford a reasonably smooth surface. The external walls of the conduits 10, 10 cooperate with said pockets 14 to form chambers within which any suitable packing material 15 may be inserted. Desirably, the threading extends substantially over the entire length of the belled portion, as shown.

A female threaded compression nut 16, the central aperture of which permits the slidable passage over a conduit 10, cooperates with an annular ring 17, of metal, fibre, or other suitable material, to compress the packing 15 within the chamber 14 and to urge the said packing uniformly against the walls of pocket 14 and conduit 10. Such ring 17 preferably has an external and internal diameter sufficient to permit a relatively close slidable engagement with the internal wall of the pocket 14, and a relatively close slidable engagement with the external wall of a conduit 10.

In the embodiment of Figure 1, the packing 15 is represented as wire solder, thermo plastic rope-like material or other suitable heat-softening substance which may be available in continuous string or rope form; the packing material may also be in the form of split or integral annular rings which may be positioned about the conduit prior to the insertion of said conduit into the coupling 12.

As shown in Figure 1, a rope-like or ring-like material may leave a plurality of voids between adjacent strands of the packing material, and between the conduit and the internal walls of the pockets 14.

In such circumstance, the reduction of the packing material to a flowable state by the application of heat, see Fig. 2, may cause a flow of material to the lower portion of the coupled joint, leaving the upper portion thereof with a deficiency of packing.

In the present invention, however, the packing material may be compressed prior to or during the application of heat, as by screwing up of a nut 16. During such operation, the annular ring 17 forcibly operates upon the packing 15 to compress the same and to substantially eliminate whatever voids may have been present initially. Thereupon, the application of heat, as by the illustrated blow torch 20, fuses the packing material 15, which later solidifies into a solid mass which may be substantially equal in volume about the full periphery of the conduit, and which bonds the external wall of the conduit to the internal wall of the pocket 14. Such ultimate condition is illustrated in Fig. 3.

The pressure on the packing material is maintained during the fusing operation; it may be desirable, with some types of packing material, to increase the pressure thereon during the fusing stage.

In the embodiment of Figure 5, there is disclosed a type of annular ring structure suitable for use with lead rope, or thermo plastic packing materials which may be of fibrous or relatively spongy character. With such materials, it may be desirable to expand the packing in two directions, while compacting its central portion, thereby to eliminate internal voids within the material and to insure an intimate contact of the material with the interior of the pocket 14 and with the exterior surface of the conduits.

In the embodiment of Fig. 5, it is preferred to employ a plurality of compression rings, as 17—1 and 17—2, an operating face of each of which is beveled to form a a wedge-face having its apex disposed substantially centrally of the inner and outer peripheral walls. Upon the screwing up of the nut 16, the pressure generated thereby compacts the central mass of the packing material 15, while concomitantly urging the outer and inner peripheral walls of the packing into intimate engagement with the surfaces of the coupling and the conduit.

Such construction, as will be readily understood affords substantial improvement over conventional forms of sleeve coupling means, and may be very successfully employed either with or without the further step of fusing the packing material.

The embodiment illustrated in Figure 6 is particularly suitable for the coupling of relatively large size conduits or like apparatus, in which it may be desired to reuse the coupling nut or like packing compression means in other installations.

Accordingly, the belled ends of the coupling 12—1 are interiorly threaded. Desirably, said threading is effected in a suitable offset portion, so that the peak of the threads clears the interior wall surface of the pockets 14, 14, thus permitting the free movement of the packing compactor means within the stated pockets.

Figure 6 illustrates the use of an annular packing compactor ring 17—1 as previously described with respect to Figure 5; it should be understood, however, that the form of packing ring illustrated in Figure 1 may be employed with equal facility.

After the insertion of the packing material 15 within the pockets 14 and the positioning of the packing ring 17—1 therein, a male threaded split compression nut 16—1 may be employed. The compression nut 16—1, following the teachings of like structures well known in the art, is diametrically split, the line of split being axially of the body of the nut. Therefore, after the positioning of the packing and compression ring, aforesaid, the nut may be inserted over the body of the conduit 10 and the halves thereof manually held together and manipulated until the engagement of the threading of the nut with the female threading of the belled ends, whereupon a wrench or like tool may be applied to "make-up" on the nut and compress the packing within the chamber 14.

After or during the step of compacting the packing material within the chamber, as aforesaid, the said packing may be fused and permitted to re-solidify, whereupon the nut 16—1 may be backed out of engagement with the coupling and removed for later use in additional installations.

As illustrated in Figure 6, the extreme end of the coupling may be sealed by the introduction of suitable plastic caulking material, designated 22. Such plastic may be of any suitable nature, depending upon the service conditions.

Whereas I have described my invention by reference to specific forms thereof, it will be understood that many changes and modifications may be made without departing from the spirit of the invention.

I claim:

The method of securement of a member within a tubular coupling means, comprising inserting said member into said coupling means, packing a fusible material within said coupling means intermediate said member and said coupling means, applying pressure to said fusible material to urge the same into intimate contact with said coupling means and said member, fusing the said material while mechanically increasing the pressure thereon, permitting the said material to re-solidify, removing said pressure generating means, and substantially filling the extreme end portion of said coupling means with plastic material.

JOSEPH F. O'BRIEN.